(12) United States Patent
Tomikawa et al.

(10) Patent No.: US 8,356,762 B2
(45) Date of Patent: Jan. 22, 2013

(54) MOUNTING STRUCTURE OF ON-VEHICLE CIRCUIT UNIT AND ON-VEHICLE CIRCUIT UNIT

(75) Inventors: Tadashi Tomikawa, Yokkaichi (JP);
Shigeki Yamane, Yokkaichi (JP);
Tomoki Kano, Yokkaichi (JP); Tsuyoshi Hosokawa, Yokkaichi (JP); Futoshi Nishida, Yokkaichi (JP)

(73) Assignees: Autonetworks Technologies Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 1701 days.

(21) Appl. No.: 10/568,191

(22) PCT Filed: Sep. 17, 2004

(86) PCT No.: PCT/JP2004/014027
§ 371 (c)(1),
(2), (4) Date: Feb. 13, 2006

(87) PCT Pub. No.: WO2005/028259
PCT Pub. Date: Mar. 31, 2005

(65) Prior Publication Data
US 2006/0289664 A1 Dec. 28, 2006

(30) Foreign Application Priority Data

Sep. 19, 2003 (JP) .................................. 2003-328583
Sep. 13, 2004 (JP) .................................. 2004-265855

(51) Int. Cl.
*B60H 1/00* (2006.01)
*B60H 1/03* (2006.01)

(52) U.S. Cl. ....... 237/12.3 R; 237/28; 165/41; 165/185; 361/715; 454/69

(58) Field of Classification Search ............. 237/12.3 R, 237/28; 454/69; 165/185, 41; 361/715, 361/704; 439/76.2
See application file for complete search history.

(56) References Cited

U.S. PATENT DOCUMENTS 3,059,167 A * 10/1962 Byles .............................. 322/25
3,106,665 A * 10/1963 Byles ............................ 361/709
(Continued)

FOREIGN PATENT DOCUMENTS

DE 34 12 510 C2 10/1984
DE 40 23 146 A1 1/1992
(Continued)

OTHER PUBLICATIONS

Avallone, et al., Marks' Standard Handbook for Mechanical Engineers, 1996, McGraw-Hill, Tenth Edition, section 4.3.*

(Continued)

*Primary Examiner* — Steven B McAllister
*Assistant Examiner* — Phillip E Decker
(74) *Attorney, Agent, or Firm* — Oliff & Berridge, PLC

(57) ABSTRACT

It is an object to effectively reduce minute clearances generated between a heat radiating member and a vehicle body and ensure good cooling performance while avoiding the occurrence of impact and noise caused by the vibration of a vehicle. A circuit unit U is mounted such that an outer surface 11B of the heat radiating member 10 to which the circuit body 30 is fixed faces a body surface S of the vehicle with a clearance. Preferably, the mounting part 12 fixed to the body of the vehicle is extended, the surface 13 of the mounting part 12 which is in contact with the body is positioned to be substantially parallel to the outer surface 11B of the heat radiating member and a step is provided in both surfaces 13, 11B. In a mounted state, the body and the outer surface 11B of the heat radiating member are facing each other in a substantially parallel state and a clearance is formed between the body and the outer surface of the heat radiating member over the entire area excluding the mounting part 12.

5 Claims, 11 Drawing Sheets

U.S. PATENT DOCUMENTS

| | | | |
|---|---|---|---|
| 4,620,263 A | | 10/1986 | Ito |
| 5,045,971 A | * | 9/1991 | Ono et al. .................... 361/714 |
| 5,311,398 A | * | 5/1994 | Schirmer et al. ............ 361/704 |
| 5,403,782 A | * | 4/1995 | Dixon et al. .................... 29/827 |
| 5,408,383 A | * | 4/1995 | Nagasaka et al. ............ 361/715 |
| 5,461,542 A | * | 10/1995 | Kosak et al. .................. 361/716 |
| 5,646,827 A | * | 7/1997 | Hirao et al. ................... 361/715 |
| 5,657,203 A | * | 8/1997 | Hirao et al. ................... 361/715 |
| 5,801,330 A | | 9/1998 | Gademann et al. |
| 5,953,207 A | * | 9/1999 | Aakalu et al. ................. 165/185 |
| 6,055,158 A | | 4/2000 | Pavlovic ....................... 361/719 |
| 6,273,181 B1 | * | 8/2001 | Matsui et al. ................. 165/185 |
| 6,282,092 B1 | * | 8/2001 | Okamoto et al. ............ 361/715 |
| 6,341,066 B1 | * | 1/2002 | Murowaki et al. ............ 361/719 |
| 6,506,061 B2 | | 1/2003 | Yuasa et al. |
| 6,704,201 B2 | * | 3/2004 | Kasuga ........................ 361/715 |
| 6,724,627 B2 | * | 4/2004 | Onizuka et al. ............... 165/185 |
| 6,779,622 B2 | | 8/2004 | Mizorogi |
| 6,785,139 B2 | * | 8/2004 | Onizuka et al. ............... 361/715 |
| 6,816,377 B2 | * | 11/2004 | Itabashi et al. ................ 361/719 |
| 6,867,968 B2 | * | 3/2005 | Katsuro et al. ............... 361/715 |
| 6,924,985 B2 | * | 8/2005 | Kawakita et al. ............. 361/715 |
| 7,108,519 B2 | * | 9/2006 | Tomikawa et al. ........... 439/76.2 |
| 7,189,082 B2 | * | 3/2007 | Fukushima et al. .......... 439/76.2 |
| 7,244,141 B2 | * | 7/2007 | Yamane et al. ............... 361/719 |
| 7,632,110 B2 | * | 12/2009 | Kanou et al. .................. 361/704 |
| 7,813,134 B2 | * | 10/2010 | Katsuro ........................ 361/715 |
| 7,877,868 B2 | * | 2/2011 | Tomikawa et al. ............ 361/714 |
| 2001/0026430 A1 | * | 10/2001 | Onizuka et al. ............... 361/103 |
| 2002/0056540 A1 | | 5/2002 | Mizorogi |
| 2003/0045137 A1 | * | 3/2003 | Yamane et al. ............... 439/76.2 |
| 2003/0117776 A1 | * | 6/2003 | Katsuro et al. ................ 361/715 |
| 2003/0161110 A1 | * | 8/2003 | Spasevski et al. ............ 361/715 |
| 2003/0169572 A1 | * | 9/2003 | Jakob et al. ................... 361/752 |
| 2005/0047095 A1 | * | 3/2005 | Tomikawa et al. ........... 361/715 |
| 2007/0195504 A1 | * | 8/2007 | Tomikawa et al. ........... 361/715 |

FOREIGN PATENT DOCUMENTS

| | | |
|---|---|---|
| DE | 101 52 924 | 6/2002 |
| DE | 102 33 836 A1 | 2/2004 |
| EP | 1780094 A1 * | 5/2007 |
| JP | 50-27079 U | 8/1975 |
| JP | Y 50-27079 | 8/1975 |
| JP | U 57-59500 | 4/1982 |
| JP | A-58-190215 | 11/1983 |
| JP | A-01-212641 | 8/1989 |
| JP | U-05-084117 | 11/1993 |
| JP | A-05-343871 | 12/1993 |
| JP | A 5-343871 | 12/1993 |
| JP | 08268336 A * | 10/1996 |
| JP | A-10-322848 | 12/1998 |
| JP | A-2002-084628 | 3/2002 |
| JP | A-2002-315148 | 10/2002 |
| JP | A-2002-320313 | 10/2002 |
| JP | A-2002-344177 | 11/2002 |
| JP | A 2003-112532 | 4/2003 |
| JP | A-2003-198159 | 7/2003 |
| JP | 2007118919 A * | 5/2007 |

OTHER PUBLICATIONS

Qin, Tianjun; "Thermal Designing of Electronic Device (I);" *Aerospace Control*; Sep. 30, 1984; Issue 3; p. 61-69.

Office Action issued in Japanese Patent Application No. 2004-265855 by the Japanese Patent Office on Feb. 2, 2010. (with English translation).

Office Action dated Jun. 26, 2012 issued in Japanese Patent Application No. 2010-103729 (with translation).

\* cited by examiner

MOUNTING STRUCTURE OF ON-VEHICLE CIRCUIT UNIT AND ON-VEHICLE CIRCUIT UNIT

FIELD OF THE INVENTION

The present invention relates to an on-vehicle circuit unit for use in a power distributor for distributing electric power from a power supply installed in a vehicle to on-vehicle devices, or the like, and to a mounting structure for the on-vehicle circuit unit.

BACKGROUND ART

Conventionally, circuit units comprising a power distribution circuit configured by stacking a plurality of bus bar boards, and having fuses and relay switches assembled thereon have generally been known as a means for distributing electric power from a common on-vehicle power supply to each on-vehicle device. In order to achieve reduction in size of the circuit unit, it has been proposed to bond a bus bar with a control circuit member, or use semiconductor switching elements such as FETs in place of relays.

However, such a circuit unit is likely to generate heat due to a relatively large current flowing in the bus bars. More particularly, in view of large amounts of heat generated in the switching elements such as FETs or relay switches, it becomes a significant problem how such large amounts of heat are effectively radiated.

As a solution to this problem, Japanese Unexamined Patent Publication No. Hei. 5-343871 discloses in FIG. 1 and FIG. 2, a control box provided with a circuit pattern including electric parts and electronic parts and arranged on a heat radiating board. The heat radiating board has the shape of a flat plate. Mounting bores are provided at an edge of one side of the heat radiating board and a bolt is inserted into each mounting bore for fixing the heat radiating board to the vehicle body so that the control box is mounted on the vehicle body in a state that substantially the entire area of an outer surface of the heat radiating board is in contact with the vehicle body.

SUMMARY OF THE INVENTION

The control box disclosed in the above patent publication is so designed to have the entire heat radiating board formed of a flat plate and to basically have the entire area of the outer surface of the heat radiating board be in contact with a vehicle body. However, in reality, due to unevenness (projections and depressions), warp, flexures and the like existing on the outer surface of the heat radiating board, minute clearances are likely to be scattered between the outer surface of the heat radiating board and the body surface. Such minute clearances retain water which may cause problems such as, it may cause rust. Particularly, the outer surface of the heat radiating board is likely to slightly float from the body at a position spaced from a position at which the heat radiating board is directly fixed to the body by means of a bolt. Impacts caused by repetitive abutment of this portion against the body surface following vibrations of the vehicle may have negative effects on the normal operation of the circuit and may cause noise.

In order to solve such problems caused by vibrations, a configuration may be considered that bolt insertion bores are evenly provided along the entire periphery of the heat radiating board and the entire periphery is directly fixed on the body by means of bolts. However, even with such a configuration, it cannot be expected to effectively reduce the minute clearances. Furthermore, the space required in order to mount the control box in a vehicle body is limited so that, for example, in the case of mounting the control box in a narrow engine room, it is actually a difficult operation to fix the entire periphery of the heat radiating board to a side wall of the body.

In view of the foregoing problems, an object of the present invention is to provide a mounting structure of an on-vehicle circuit unit having good cooling performance of a heat radiating member with the minute clearances between a heat radiating member and a body being effectively reduced while the occurrence of impact and noise caused by vibrations of a vehicle are avoided.

In order to attain the object, in a structure for mounting an on-vehicle circuit unit to a vehicle, the on-vehicle circuit unit comprises a circuit board having a power circuit, and a heat radiating member having an inner surface to which the circuit board is fixed in a state of conducting heat thereto, and an outer surface functioning as a heat radiating surface, wherein the on-vehicle circuit unit is attached to a body of a vehicle in such a state that the heat radiating member faces the vehicle body with a clearance.

Such a configuration differs from the structure described in the above patent publication in that there is no risk that minute clearances are scattered between the outer surface of the heat radiating member and the body. Moreover, even if the outer surface of the heat radiating member and the body are spaced apart, an excellent cooling effect can be obtained by achieving an effective heat transfer by means of radiation from the heat radiating member to the vehicle body. Particularly, in the case of a structure that the outer surface of the heat radiating member of the on-vehicle circuit unit and the surface of a side wall of the vehicle body facing the outer surface have a radiance equal to or above 0.70 and equal to or below 1.00, it is possible to achieve an good heat transfer from the heat radiating member to the vehicle body despite the presence of a clearance.

From the point of view of such heat transfer, it is preferable that the on-vehicle circuit unit is attached to the body so that the vehicle body and the outer surface of the heat radiating member of the on-vehicle circuit unit face each other in a substantially parallel state.

In this case, from the view point of component arranging space in the vehicle body, it is not efficient to unnecessarily increase the dimension of the clearance formed between the outer surface of the heat radiating member and the surface of the vehicle body (generally, the dimension of the step formed between a surface of the mounting part which is in contact with the vehicle body and an outer surface of the heat radiating member), and it is preferable that the actual dimension of the clearance is equal to or smaller than 20 mm. On the other hand, by setting the minimum value of this clearance to equal to or larger than 3 mm, occurrence of noise and impact caused by vehicle vibrations can be reliably avoided.

The entire outer surface of the heat radiating member may be spaced apart from the vehicle body. Instead, the heat radiating member may have a mounting part which is to be fixed to the vehicle body in a state that it is in contact with the vehicle body. In the case that an outer surface of the heat radiating member, except the mounting part, faces the vehicle body with a clearance, with the mounting part being fixed to the vehicle body, the cooling performance can be further improved by means heat conduction from the mounting part to the vehicle body. The mounting part contacts the body locally and is thus different from the conventional structure that the entire outer surface of the heat radiating member is in contact with the vehicle body. Accordingly, this configuration substantially eliminates the risk of scattering of minute clearances between the outer surface of the heat radiating member and the vehicle body. Even in the case of providing the mounting part on a part of, not on the entire periphery of the heat radiating member, the occurrence of noise and impacts caused by repetitive contacts of the heat radiating member with the body when the vehicle vibrates, can be avoided.

The on-vehicle circuit unit may be attached to any portion of the vehicle body. However, the above-mentioned structure is effective in the case that the circuit unit is mounted inside a particularly narrow space, for instance, in the case that the mounting part of the on-vehicle circuit unit is fixed in a state that it is in contact with the inner surface of the engine room.

In this case, if the on-vehicle circuit unit is mounted on the vehicle unit with the mounting part oriented to face upwardly, the mounting operation of the circuit unit can be easily carried out from an upper side even inside an engine room packed with on-vehicle devices.

Generally, a body of a vehicle comprises a side wall portion which has a hollow structure (two-layered structure) and a relatively low heat radiation performance to the exterior, and a bottom wall portion which has a high heat radiation performance. Accordingly, if the mounting part is fixed to the bottom surface of the engine room in such a state that it is in contact with the bottom surface, an even higher cooling performance can be obtained.

As an actual coupling structure for fixing the mounting part to the vehicle body, it is preferable that a bolt insertion bore is provided in the mounting part and a metal bolt is inserted in the bolt insertion bore to fix the mounting part to the vehicle body. With such a structure, heat transfer from the heat radiating member to the body can be made more effectively by means of the metal bolt.

According to an aspect of the present invention, the outer surface of the heat radiating member may face a battery provided inside the engine room, in place of facing the vehicle body. Since the temperature of the battery is considerably lower as compared to the temperature inside the engine room, the excellent cooling performance of the heat radiating member can be exerted if the heat radiating member is arranged such that its outer surface faces the battery.

The on-vehicle circuit unit may be mounted on the vehicle by itself or may be mounted on the vehicle body with the on-vehicle circuit unit being incorporated in a common electric connection box together with other circuit components. In the latter case, the on-vehicle circuit unit may be incorporated in the electric connection box in a condition that the outer surface of the heat radiating member of the on-vehicle circuit unit is exposed to the exterior.

According to another aspect of the present invention, an on-vehicle circuit unit comprising a circuit board having a power circuit, and a heat radiating member having an inner surface to which the circuit board is fixed in a heat conducting state, and an outer surface functioning as a heat radiating member, wherein the heat radiating member has a mounting part which is to be fixed to a vehicle body in such a state that it is in contact with the vehicle body, and a step is provided between a surface of the mounting part that contacts the body and the outer surface of the heat radiating member so that the outer surface of the heat radiating member, except the mounting part, faces the vehicle body with a clearance, in a condition that the mounting part is fixed to the vehicle body.

When the mounting part of the on-vehicle circuit unit is fixed to the vehicle body, a structure is achieved that the vehicle body faces the outer surface of the heat radiating member, except the mounting part, with a clearance.

If the surface of the mounting part that is in contact with the body is substantially parallel with the outer surface of the heat radiating member, the outer surface of the heat radiating member faces the vehicle body in a substantially parallel state.

Also, it is preferable that the dimension of the step formed between the surface of the mounting part that contacts the vehicle body and the outer surface of the heat radiating member is in the range of 3 mm to 20 mm.

The heat radiating member may have any actual shape. However, if a heat radiating member is formed of a metal plate with a mounting part extending with a step from an edge of the metal plate, the heat radiating member has a simple structure and can ensure an appropriate clearance between the outer surface of the heat radiating member and the body.

BRIEF DESCRIPTION OF THE DRAWINGS

FIG. 9 is a front sectional view showing an exemplary engine room in which a mounting part of the heat radiating plate of the circuit unit is dispensed with.

DETAILED DESCRIPTION OF THE PREFERRED EMBODIMENTS OF THE INVENTION

The preferred embodiments of this invention are next described with reference to the accompanying drawings. The preferred embodiments described herein is of the type wherein the present invention is applied to a circuit unit U which comprises a power distribution circuit for distributing power from a common power supply to a plurality of on-vehicle devices. However, the present invention is not limited to this, but can also be widely applied to a circuit unit for forming various circuits.

Figure 1:
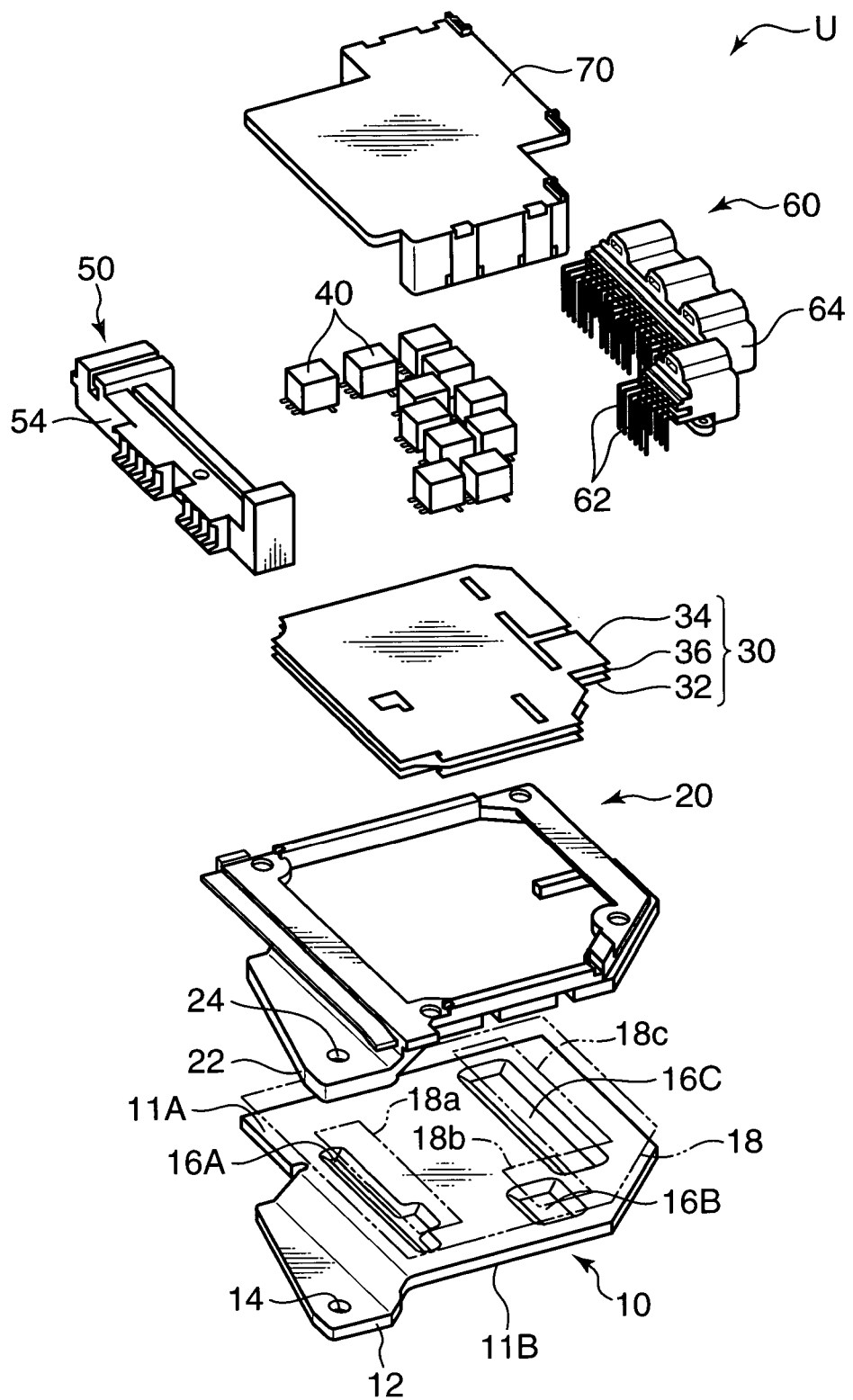
FIG. 1 is an exploded perspective view showing a circuit unit to which the present invention is applied.
Figure 2:
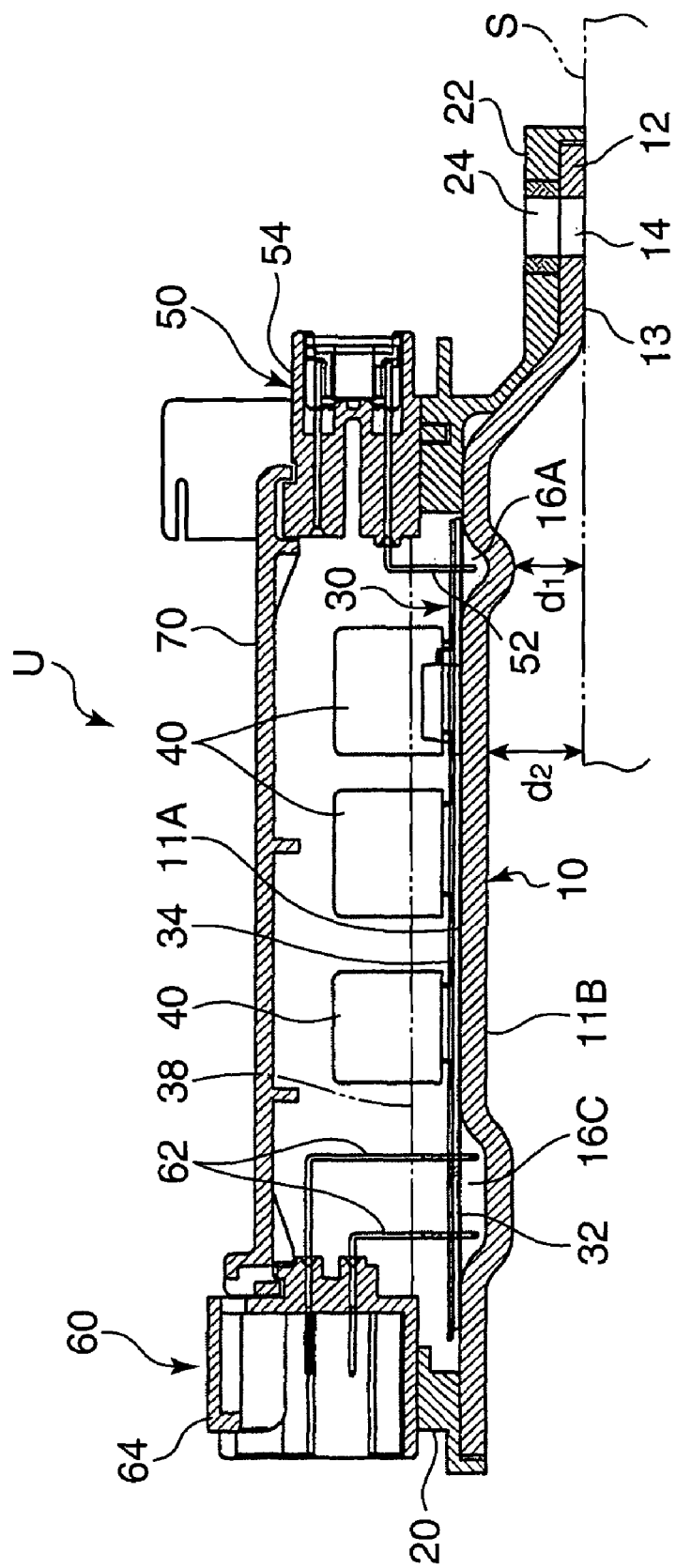
FIG. 2 is a sectional view of the above-mentioned circuit unit.

The circuit unit U shown in FIG. 1 and FIG. 2 comprises a heat radiating plate (heat radiating member) 10, a casing 20 and a sheet-shaped circuit board 30. Board mounted elements 40 and connectors 50 and 60 are mounted on the circuit board 30. A cover 70 for covering the circuit board 30 is to be installed over both connectors 50 and 60.

The heat radiating plate 10 is formed of a metal plate such as aluminum alloy, or the like having good heat conductivity. An outer surface (bottom surface in FIG. 1 and FIG. 2) 11B of the heat radiating plate 10 functions as a heat radiating surface. The casing 20 and the circuit board 30 are adhered to an inner surface (top surface in FIG. 1 and FIG. 2) 11A of the heat radiating plate 10 via a common adhesive sheet 18 in an insulated state.

The casing 20 is molded of an insulating material such as synthetic resin or the like, and in the drawing has the shape of a frame surrounding a periphery of the circuit board 30.

The circuit board 30 comprises a power distribution circuit for distributing power from an on-vehicle power supply to a plurality of loads, and a control circuit for controlling on/off of this power circuit. The power circuit is configured of a bus bar layer 32 comprising a plurality of bus bars arranged on the same plane. The control circuit is assembled in a thin printed circuit board 34. Each bus bar 32 is adhered to a bottom surface of the printed circuit board 34 via an adhesive layer 36 in an insulated state.

The present invention does not require any specific structure for the circuit board. For example, the circuit board may comprise a plurality of bus bars and insulating plates which are stacked one on the other as in a conventional bus bar board.

Besides the relay switching elements as shown in the drawing, the board mounting elements 40 include semiconductor elements such as FETs, resistor elements and other electric circuit elements or the like, and are suitably mounted on the bus bar layer 32 and the printed circuit board 34 of the circuit board 30.

The connector 50 is adapted to input a power supply to the circuit board 30, and the connector 60 is adapted to output power from the circuit board 30 to each on-vehicle device and send and receive signals among the circuit board 30 and each sensor and other control units. These connectors 50 and 60 are provided with connector terminals including board connection terminals 52 and 62, respectively, and a housing 54 and 64, respectively, for retaining these terminals. The board connection terminals 52 and 62 are connected to the circuit board 30 by soldering, or the like in such a state that they extend through the circuit board 30.

In the drawing, through holes 18a, 18b and 18c are provided in the adhesive sheet 18 and denting portions 16A, 16B and 16C are formed on the heat radiating plate 10 in order to avoid contact between the board connection terminals 52 and 62 protruding from a lower surface of the circuit board 30 with the adhesive sheet 18 and the heat radiating plate 10. These denting portions 16A, 16B and 16C are formed to be depressed in a downward direction by pressing middle portions of the heat radiating plate 10 and an outer surface 11B of the heat radiating plate 10 locally protrudes at the positions where the denting portions are formed.

Next, a structure for mounting the circuit unit U to the vehicle body is described.

A mounting part 12 extends from a specific position at an edge of the heat radiating plate 10. An outer surface of the mounting part 12 (bottom surface in FIG. 1 and FIG. 2) functions as a contact surface 13 which is to be brought into contact with a body surface S. The mounting part 12 is provided with a bolt insertion bore 14 which extend through the mounting part 12 in its thickness direction.

Further, at a side of the casing 20, a mounting part cover 22 is formed which is located over the vehicle mounting part 12 of the heat radiating plate. The mounting part cover 22 is provided with a bolt insertion bore 24 which coincides with the bolt insertion bore 14. A bolt is inserted in bolt insertion bores 14 and 24 in such a state that the contact surface 13 is brought into contact with the body surface S, thereby fixing the mounting part 12 to the body.

As a characteristic of the circuit unit U, a base portion of the mounting part 12 extends obliquely. Thus, the contact surface 13 of the mounting part 12 and the outer surface 11B of the heat radiating plate 10 are substantially parallel to each other, and a step is formed between those surfaces 13 and 11B.

With the circuit unit U having the above configuration, if a contact surface 13 of a mounting part 12 is brought into contact with the board surface S at a suitable position, the mounting part 12 is fixed to the vehicle body by means of the bolt that is inserted in the bolt insertion bores 14 and 24 which, in turn, are formed in the mounting part 12 and the mounting part cover 22, respectively. For instance, in the case that the body surface S is flat, in the circuit unit U, the entire area of the outer surface 11B of the heat radiating plate, except the mounting part 12, faces the body surface S in a substantially parallel state, with a clearance of the dimension corresponding to the elevation of the step. By reliably spacing the outer surface 11B of the heat radiating plate from the body surface as described above, rust caused by moisture accumulation can be avoided.

The dimension of the clearance may be arbitrarily set, however, the minimum value (in the drawing, the dimension d1 of the clearance formed between the body surface S and the outer surface 11B at a position where the denting portions 16A to 16C are formed) is preferably set to be equal or larger than 3 mm. By securing such a clearance, it is possible to reliably avoid repetitive contacts of the outer surface 11B of the heat radiating plate (in particular, outer surface 11B at an end of a side opposite the mounting structure 12) with the vehicle body, which repetitive contacts are caused by vibrations, or the like of the vehicle, and noise and impacts caused by such contacts can be prevented from occurring.

Although the outer surface 11B and the body surface S are spaced apart, heat transfer to the body can be effectively carried out by radiation from the outer surface 11B, thereby securing a high cooling effect. Here, the radiance of the aluminum plate or the steel plate which are the base materials for the vehicle body and the heat radiating plate 10 is around 0.2. However, if the plates are coated with paint, a radiance of around 0.7 can easily be achieved. Accordingly, it is preferable the outer surface 11B of the heat radiating plate and the body surface S facing the outer surface 11B have a radiance between 0.7 and 1.0.

On the other hand, the maximum value of the dimension of the clearance (in the drawing, the dimension of the clearance formed between the body surface S and an outer surface 11B except the positions of the denting portions 16A to 16C) d2 is preferably set to be equal to or smaller than 20 mm. In this manner, the circuit unit U and the body can be approximated and the mounting space can thereby be reduced.

In the case that the board surface S is not flat, for instance, in the case that it is curved or uneven, these undulations are anticipated and the elevation of the step between the outer surface 11B and the contact surface 13 is so set that the dimension of the clearance between the body surface S and the outer surface 11B of the heat radiating plate is finally kept within the above mentioned range.

Figure 3:
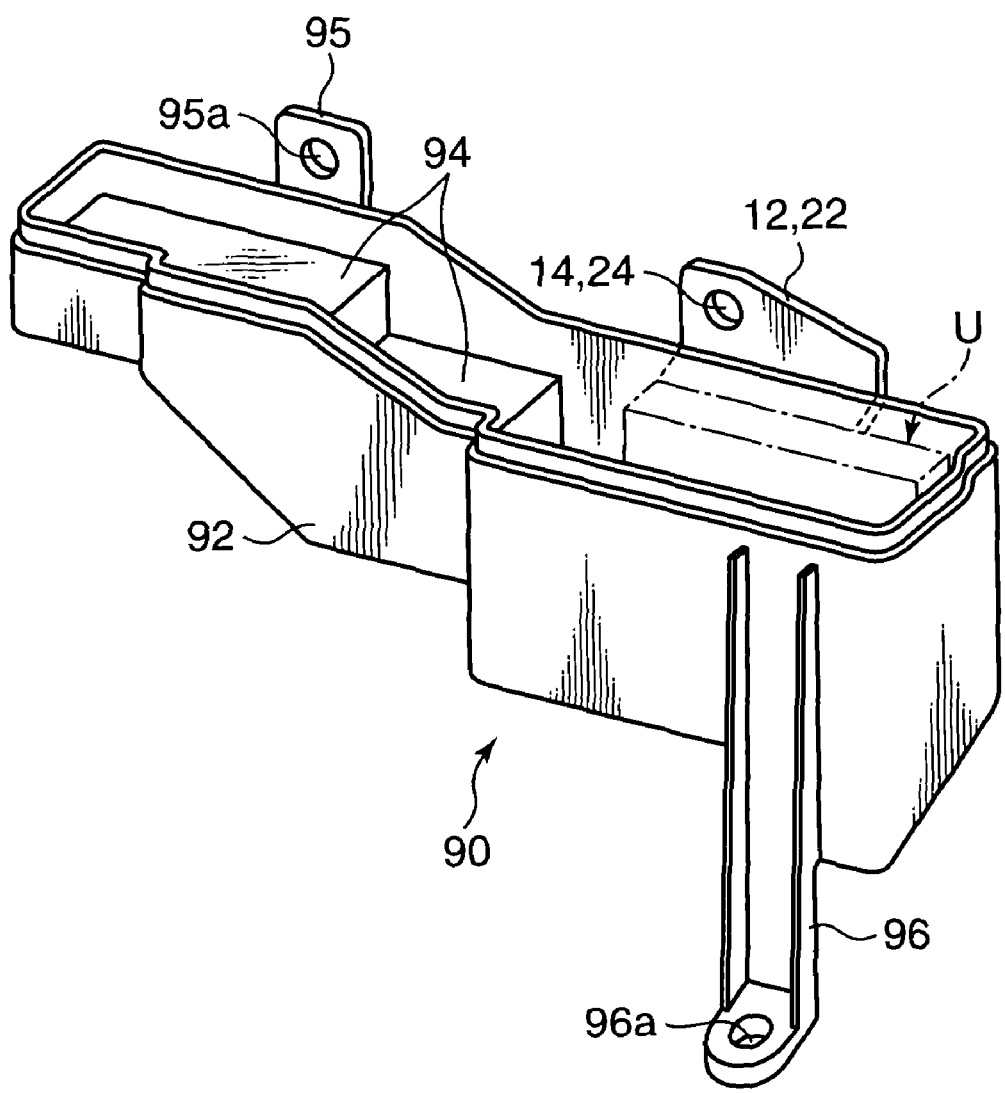
FIG. 3 is a perspective view of an electric connection box incorporating the circuit unit.

This circuit unit U may be mounted to the vehicle body by itself, and may also be mounted in a state that it is incorporated in a common electric connection box together with other circuit boards. Such a configuration is shown in FIG. 3.

The electric connection box 90 shown in the drawing comprises a lower case 92 and an upper case, which is not shown. The lower case 92 incorporates the circuit unit U and other circuit boards 94. The circuit unit U is incorporated in the lower case such that the outer surface 11B of the heat radiating plate 10 is exposed to the outside from a side wall of the lower case 92, and the mounting part 12 and the mounting part cover 22 are projected laterally from the lower case 92. Besides the mounting part 12, mounting strips 95 and 96 are provided so as to protrude from the lower case 92 and each of them is provided with a bolt insertion bore 95a or 96a, respectively.

Figure 4:
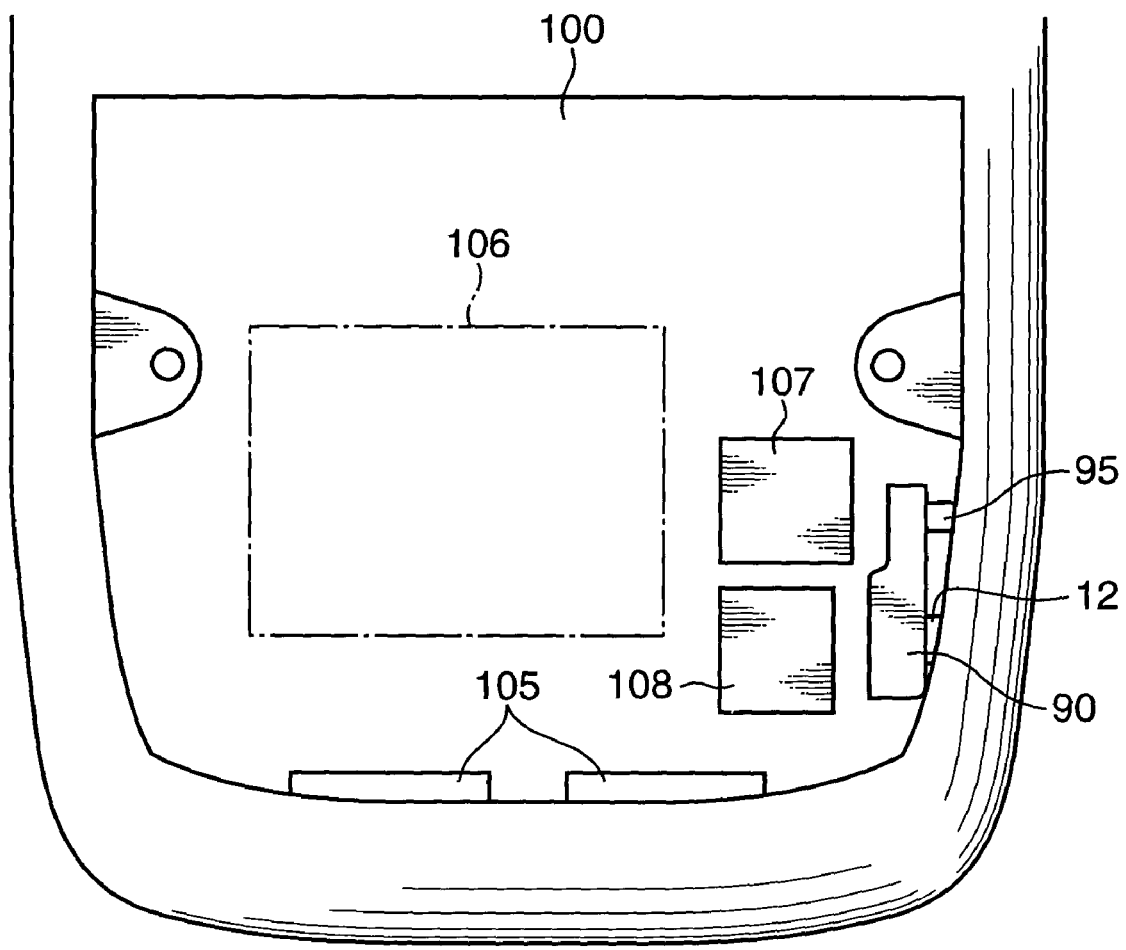
FIG. 4 is a plan view showing an engine room equipped with the electric connection box.
Figure 5:
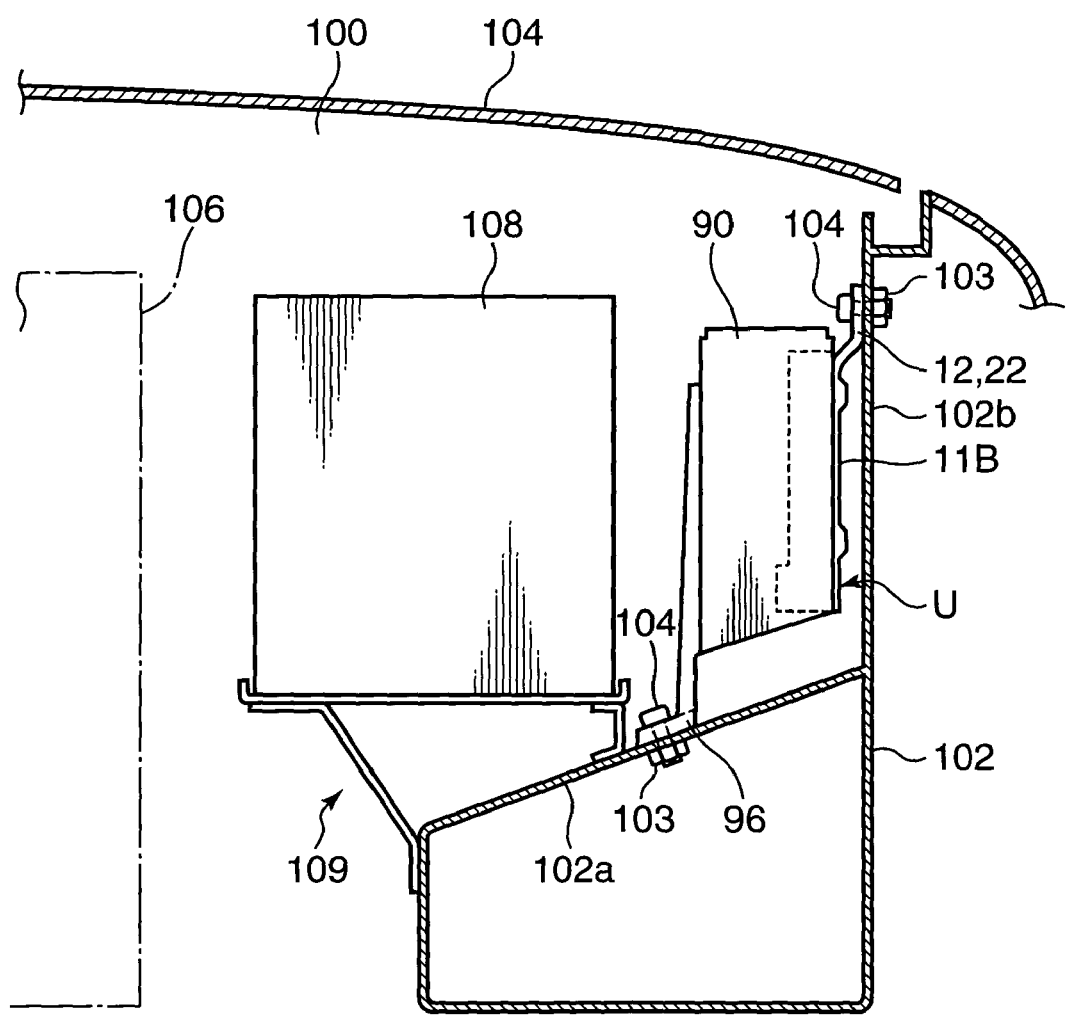
FIG. 5 is a sectional front view showing a structure inside the engine room.

FIG. 4 and FIG. 5 show an example of an engine room 100 which is provided under a bonnet 104 and in which the electric connection box 90 is mounted. The engine room 100 includes a radiator fan 105 installed at its front portion, an engine 106 installed at its central portion, and an air cleaner 107 and a battery 108 installed at a side of the engine 106. The electric connection box 90 is longitudinally installed in a narrow space existing between the battery 108 and an inner wall of the engine room.

Specifically, a reinforcement 102 extends back and forth at the right and left lateral portions of the engine room 100. The mounting strip 96 of the lower case 92 is fixed to a bottom wall 102a of the engine room formed by the reinforcement 102, by means of a metal bolt 104 inserted in the bolt insertion bore 96a which is provided in the mounting strip 96. The mounting part 12 of the circuit unit U and the mounting strip 95 of the lower case 90 are fixed to an inner wall (side wall) 102b of the engine room formed by the reinforcement 102, by means of a metal bolt 104 inserted in the bolt insertion bores 14, 95a. Specifically, the bottom wall 102a and inner wall 102b of the engine room are provided at suitable positions with bolt insertion bores and a nut 103 is fixed to a back side of the bolt insertion bores by welding or the like. The metal bolts 104 inserted into the bolt insertion holes 14 and 95a are screwed into the nut 103 thereby fixing each mounting strip 95 or 96 to the bottom wall 102a and inner wall 102b of the engine room, respectively.

In such a structure, the outer surface 11B of the heat radiating plate faces the inner wall 102b of the engine room with a substantially constant clearance, and the heat of the heat radiating plate 10 is effectively transferred to the reinforcement 102 not only by radiation but also by heat conduction through the contact surface 13 and the metal bolt 104. Also, the mounting part 12 is mounted to the inner wall 12 in a state that it is oriented upward, thereby facilitating a mounting operation which is carried out from an upper side of the engine room 100.

Figure 6:
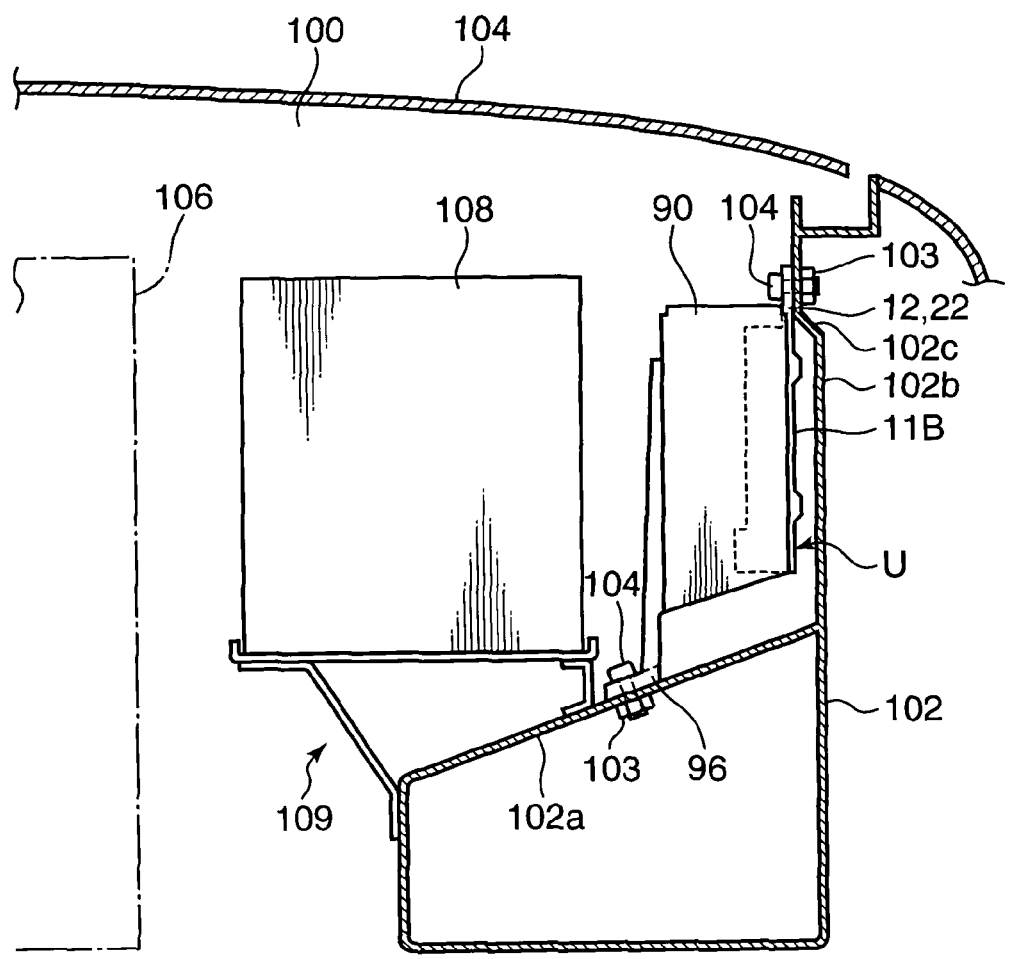
FIG. 6 is a sectional front view showing an exemplary engine room having an inner wall formed with a step.

As shown in FIG. 6, a shoulder 102c may be formed on the inner wall 102b of the engine room, in place of providing a step between the contact surface 13 of the mounting part 12 and the outer surface 11B of the heat radiating plate 10. Accordingly, even if a step is formed between a position where the mounting part 12 is fixed, and its lower position, the outer surface 11B of the heat radiating plate and the inner wall 102b of the engine room can be arranged to face each other with a clearance having a dimension corresponding to the elevation of the step.

Figure 7:
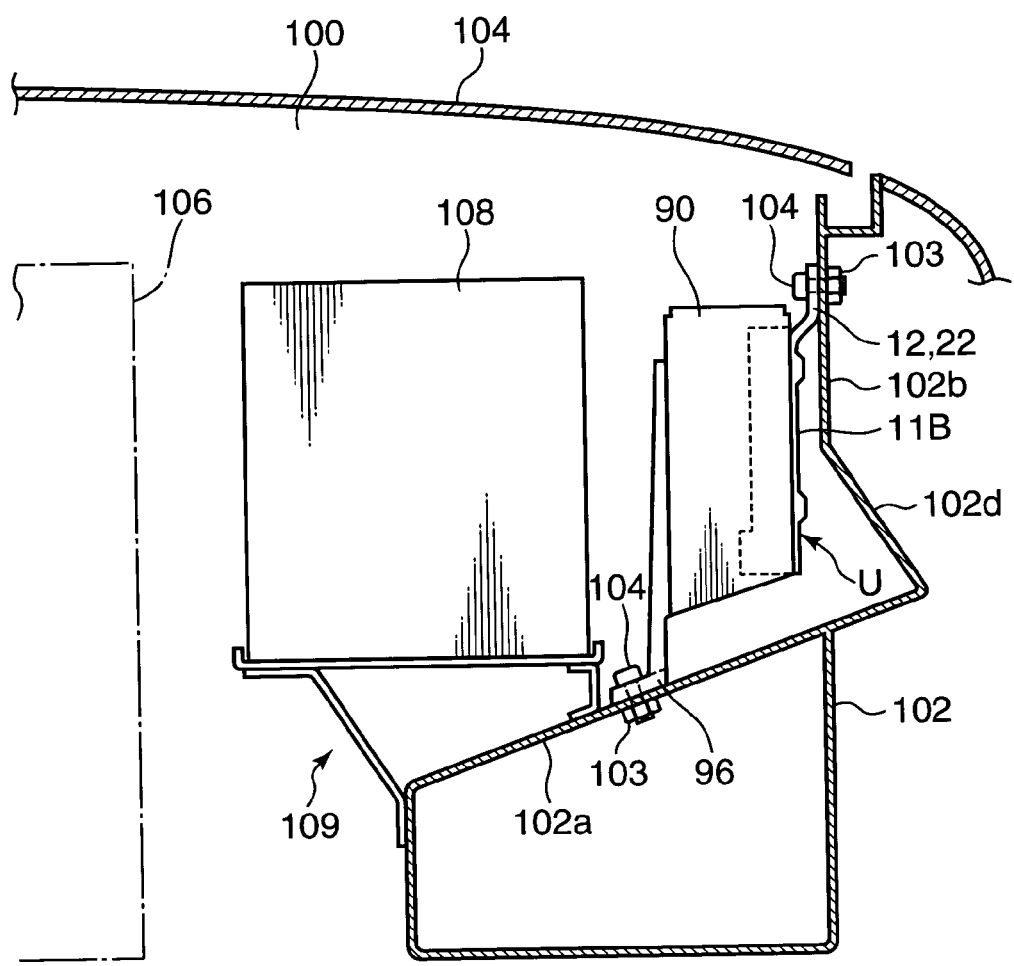
FIG. 7 is a sectional front view showing an exemplary engine room comprising an inner wall having an inclined lower portion.
Figure 8:
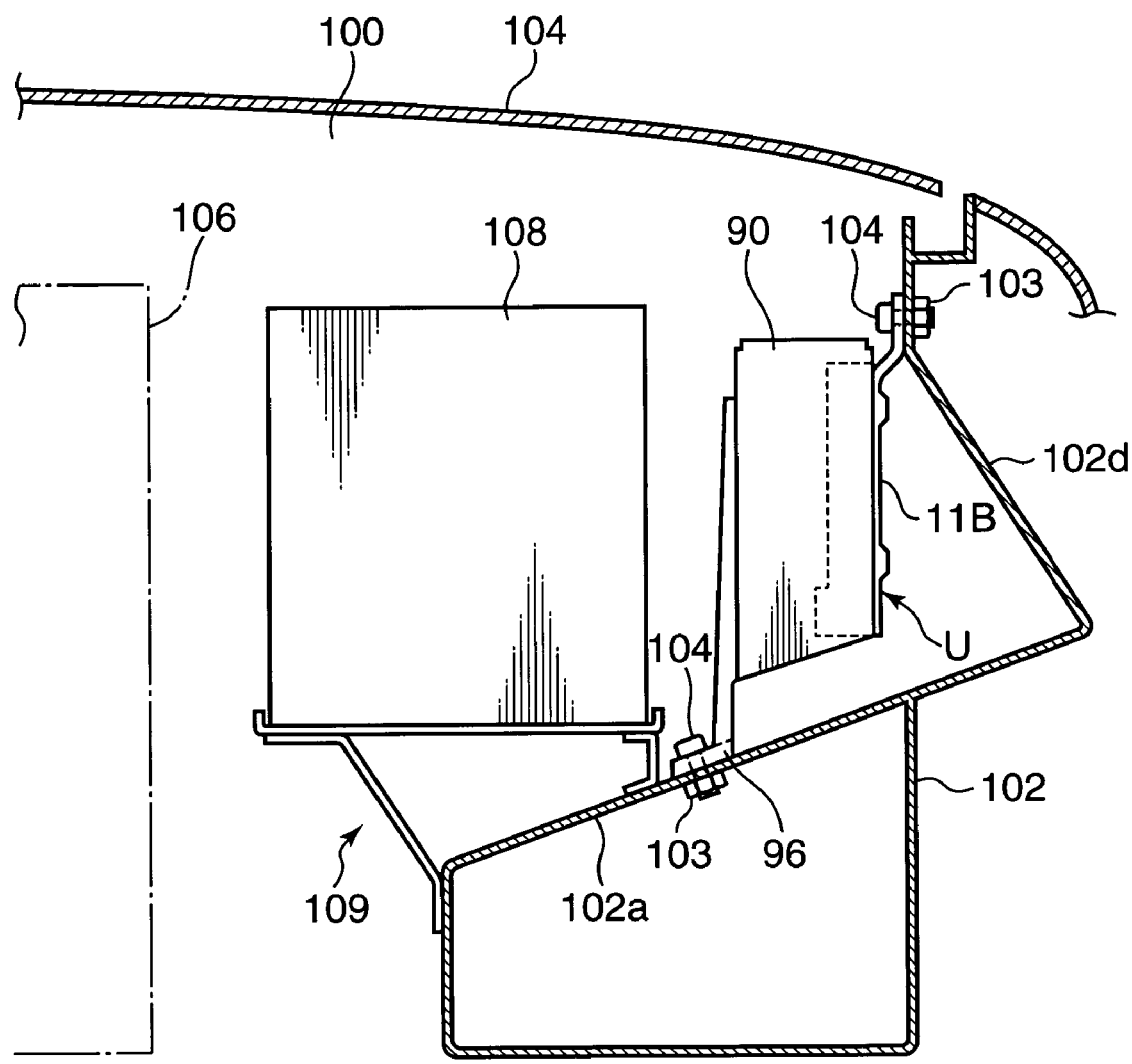
FIG. 8 is a sectional front view showing an exemplary engine room having an inner wall which is inclined in its entirety.

The present invention is not limited to the case where the entire area of the outer surface 11B of the heat radiating plate, except the mounting part 12, is substantially parallel with the inner wall 102b of the engine room. Instead, for instance, as shown in FIG. 7 and FIG. 8, an inclined surface 102d which is inclined with respect to the outer surface 11B, may be formed at the position of the engine room inner wall 102b that faces a lower portion of the outer surface 11B of the heat radiating plane, or at a position facing the entire outer surface 11B of the heat radiating plate.

Figure 9:
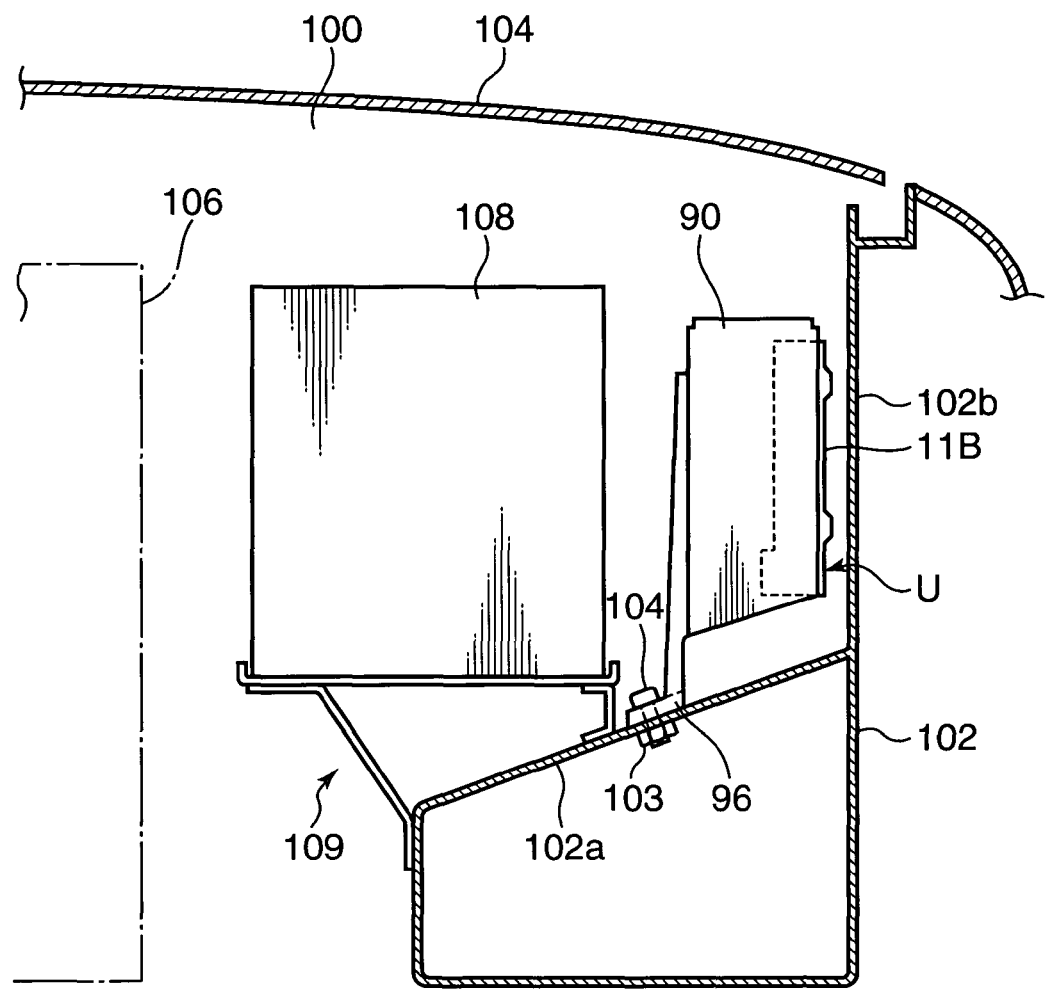

The mounting part 12 may also be omitted and the entire outer surface 11B of the heat radiating plate may face the inner wall of the engine room 102b, as shown in FIG. 9. In this case, heat conductivity from the heat radiating plate 10 towards the engine room inner wall 102b does not occur, however, the heat radiating member 10 can be cooled by heat transfer due to heat conductivity.

Figure 10B:
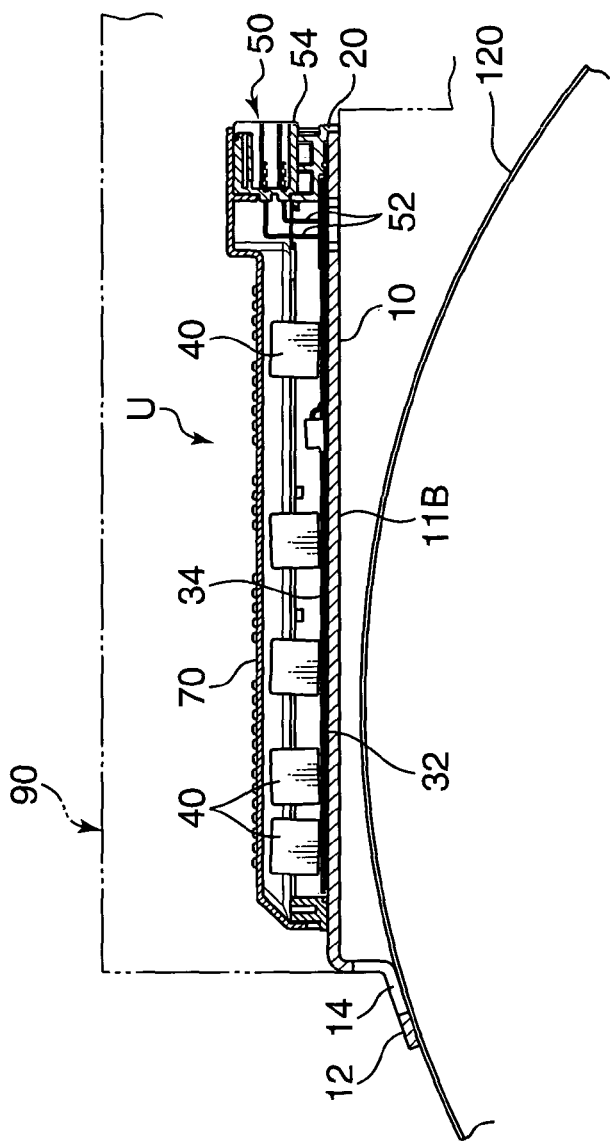
FIG. 10B is a front sectional view showing a mounting state of the circuit unit.
Figure 10A:
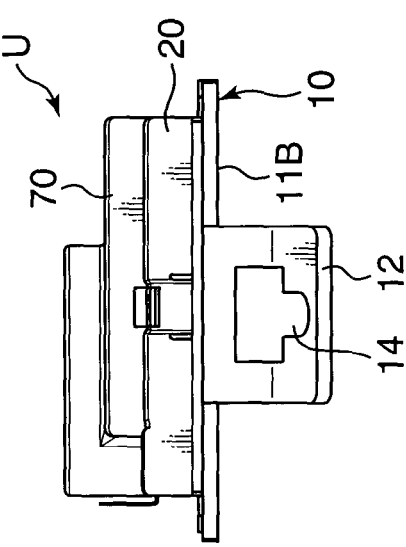
FIG. 10A is a side view showing an exemplary circuit unit to be mounted on an upper surface of a wheel house.

In the present invention, the position facing the outer surface 11B of the heat radiating plate or the position at which the mounting part 12 is fixed is not limited to the above-described engine room inner wall 102b. The mounting part 12 may be brought into contact with and fixed to the bottom surface of the engine room 100, for instance an upper surface of the wheel house 120 as shown in FIG. 10, so that the outer surface 11B of the heat radiating plate may face the upper surface of the wheel house 120.

Generally, a side wall of the vehicle body (for instance, a fender surrounding the engine room from the right and left sides) has a hollow double-layered structure which in most cases has relatively low heat radiation performance to the outside. Contrary to this, a bottom wall of the vehicle body including the wheel house 120 is formed of a single metal plate which in most cases has relatively high heat radiation performance. Thus, an excellent cooling performance can be effectively achieved by making the outer surface 11B of the heat radiating plate face the bottom surface of the vehicle body.

In this case also, a mounting part extending from the case of the electric connection box 90 incorporating the circuit unit U and this mounting part may be fixed to the wheel house 120 and the engine room side wall, etc.

Figure 11:
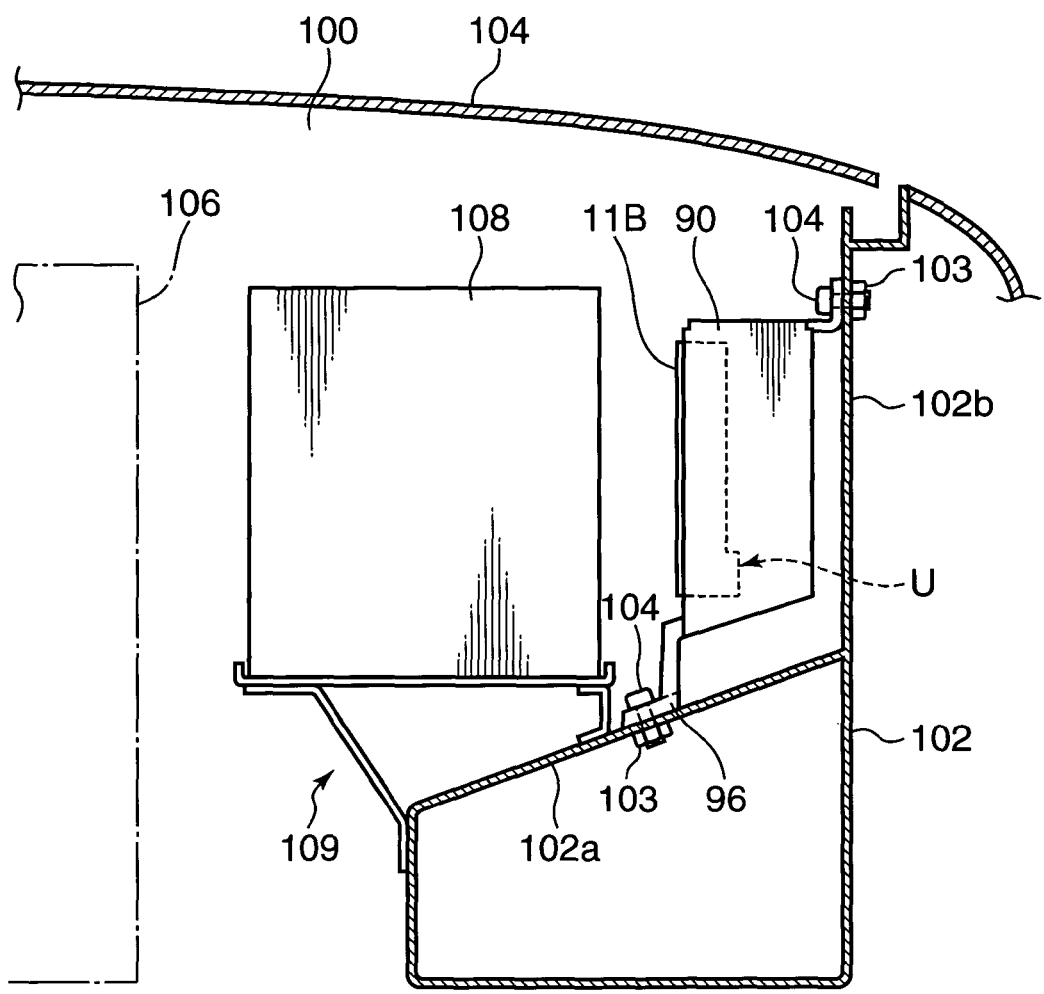
FIG. 11 is a sectional front view showing an exemplary engine room wherein an outer surface of a heat radiating plate of a circuit unit faces a battery.

Also, it is effective when the circuit unit U is arranged so that the outer surface 11B of the heat radiating plate faces the battery 108 installed inside the engine room 100, as shown in FIG. 11, in place of facing the engine room inner wall 102b and the wheel house 120. Generally, the battery 108 contains a decomposition liquid and a surface thereof is so configured that a low temperature can be maintained despite a rise in the temperature inside the engine room. Accordingly, by arranging the outer surface 11B of the heat radiating plate 10 so as to face the surface of the battery 108, its excellent cooling performance can be attained.

The heat radiating member according to the present invention is not limited to a plate such as the heat radiating plate 10, and a block-like configuration, for instance, may also be employed. However, if the heat radiating member is formed of a metal plate like as the heat radiating plate 10 shown in the drawing, with the mounting part 12 being extended from an edge of the metal plate by a step, it is possible to build a heat radiating member having a simple structure and high heat radiation performance.

INDUSTRIAL APPLICABILITY

The above-described invention effectively reduces minute clearances generated between an on-vehicle circuit unit, a heat radiating member and a vehicle body while avoiding the occurrence of impact and noise caused by the vibration of a vehicle and is advantageous in that it realizes effective heat transfer by means of radiation from the heat radiating member to the vehicle body, thereby achieving excellent cooling effects.

The invention claimed is:

1. An assembly to be provided on a vehicle having an engine room, the assembly comprising:
   a wall of the engine room, the wall having an inner surface;
   an on-vehicle circuit unit that includes a circuit board having a power circuit, a heat radiating member having an inner surface to which the circuit board is fixed in a manner that enables heat conduction and an outer surface functioning as a heat radiating surface, and a unit casing surrounding the circuit board and fixed to the inner surface of the heat radiating member in a manner that does not impede the heat conduction between the circuit board and the heat radiating member; and a box case other than the heat radiating member and the unit casing, the box case constituting an electric connection box and incorporating the on-vehicle circuit unit including the unit casing and the heat radiating member and other circuit components while exposing the outer surface of the heat radiating member of the on-vehicle circuit unit to an outside of the box case, wherein the heat radiating member has a mounting part which is fixed to the wall so as to make contact with the wall, and the box case has a mounting portion which is fixed to a second surface of the engine room, the mounting part and the mounting portion being fixed to the wall and the second surface respectively so as to make the outer surface of the heat radiating member face the inner surface of the wall of the engine room with a clearance to thereby achieve a heat transfer by radiation from the heat radiating member to the wall.

2. The assembly according to claim 1, wherein the mounting part of the heat radiating member and the mounting portion of the box case are fixed to the wall and second surface of the engine room respectively so as to make the outer surface of the heat radiating member be in parallel with the inner surface of the wall of the engine room.

3. The assembly according to claim 2, wherein the mounting part of the heat radiating member and the mounting portion of the box case are fixed to the wall and second surface of the engine room respectively to make the clearance between the outer surface of the heat radiating member and the inner surface of the wall of the engine room fall in a range of 3 mm to 20 mm.

4. The assembly according to claim 1, wherein the mounting part of the heat radiating member is fixed to a side wall of the engine room and the mounting portion of the box case is fixed to a bottom wall of the inner surface of the engine room.

5. The assembly according to claim 1, wherein the on-vehicle circuit unit is fixed to the engine room in a state in which the mounting part faces upward.

* * * * *